US010228197B2

(12) United States Patent
Cognata et al.

(10) Patent No.: US 10,228,197 B2
(45) Date of Patent: Mar. 12, 2019

(54) VARIABLE HEAT REJECTION DEVICE

(71) Applicants: Thomas Jaspero Cognata, Houston, TX (US); Darren Hartl, College Station, TX (US); Rubik Sheth, Houston, TX (US); Craig Dinsmore, Houston, TX (US)

(72) Inventors: Thomas Jaspero Cognata, Houston, TX (US); Darren Hartl, College Station, TX (US); Rubik Sheth, Houston, TX (US); Craig Dinsmore, Houston, TX (US)

(*) Notice: Subject to any disclaimer, the term of this patent is extended or adjusted under 35 U.S.C. 154(b) by 336 days.

(21) Appl. No.: 14/960,301

(22) Filed: Dec. 4, 2015

(65) Prior Publication Data

US 2017/0160021 A1 Jun. 8, 2017

(51) Int. Cl.
*F28F 27/00* (2006.01)
*F01P 7/10* (2006.01)
*F28F 5/00* (2006.01)
*F28D 15/00* (2006.01)
*B64G 1/50* (2006.01)
*F28F 13/00* (2006.01)
*F28F 1/14* (2006.01)
*F28D 21/00* (2006.01)

(52) U.S. Cl.
CPC ............... *F28F 5/00* (2013.01); *B64G 1/50* (2013.01); *F28D 15/00* (2013.01); *F28F 1/14* (2013.01); *F28F 13/00* (2013.01); *F28D 2021/0021* (2013.01); *F28F 2245/06* (2013.01); *F28F 2255/02* (2013.01); *F28F 2255/04* (2013.01)

(58) Field of Classification Search
CPC .. F28F 5/00; F28F 3/02; F28F 2245/06; F28F 2255/02; F28F 2255/04; F28F 2215/14; F28D 15/00; F28D 2021/0021
USPC .............................. 165/86, 96, 98, 272, 274
See application file for complete search history.

(56) References Cited

U.S. PATENT DOCUMENTS

| 3,399,717 | A |   | 9/1968  | Cline           |           |
|-----------|---|---|---------|-----------------|-----------|
| 3,496,995 | A |   | 2/1970  | Rosen et al.    |           |
| 3,602,429 | A |   | 8/1971  | Levedahl et al. |           |
| 3,768,754 | A |   | 10/1973 | Janes           |           |
| 3,872,911 | A |   | 3/1975  | Janes           |           |
| 3,903,699 | A |   | 9/1975  | Davis           |           |
| 4,212,347 | A |   | 7/1980  | Eastman         |           |
| 4,402,358 | A |   | 9/1983  | Wolf            |           |
| 4,603,731 | A | * | 8/1986  | Olsen ........... | B64G 1/503 |
|           |   |   |         |                 | 165/171   |
| 4,603,732 | A |   | 8/1986  | Niggemann       |           |
| 4,727,932 | A |   | 3/1988  | Mahefkey        |           |
| 4,813,476 | A |   | 3/1989  | Mahefkey        |           |
| 5,086,828 | A |   | 2/1992  | Ewert           |           |

(Continued)

*Primary Examiner* — Jason Thompson

(57) ABSTRACT

A heat rejection system that employs temperature sensitive shape memory materials to control the heat rejection capacity of a vehicle to maintain a safe vehicle temperature. The technology provides for a wide range of heat rejection rates by varying the shape and thus effective properties of the heat rejection system in response to temperature. When employed as a radiator for crewed spacecraft thermal control this permits the use of higher freezing point, non-toxic thermal working fluids in single-loop thermal control systems for crewed vehicles in space and other extraterrestrial environments.

10 Claims, 4 Drawing Sheets

(56) References Cited

U.S. PATENT DOCUMENTS

| | | | |
|---|---|---|---|
| 5,732,765 A * | 3/1998 | Drolen | B64G 1/50 |
| | | | 165/41 |
| 5,743,325 A | 4/1998 | Esposto | |
| 5,806,800 A | 9/1998 | Caplin | |
| 6,003,817 A | 12/1999 | Basuthakur et al. | |
| 6,439,297 B1 | 8/2002 | Dunbar et al. | |
| 6,511,021 B1 | 1/2003 | Keramidas | |
| 6,538,796 B1 * | 3/2003 | Swanson | B64G 1/50 |
| | | | 359/290 |
| 6,626,231 B2 * | 9/2003 | Cluzet | B64G 1/503 |
| | | | 165/41 |
| 6,669,147 B2 | 12/2003 | Bertheux et al. | |
| 6,899,170 B2 | 5/2005 | Biter | |
| 7,028,953 B2 | 4/2006 | Sebata et al. | |
| 7,080,681 B2 * | 7/2006 | Wert | F28D 15/025 |
| | | | 165/104.21 |
| 7,390,123 B2 | 6/2008 | Friedman | |
| 7,752,866 B2 | 7/2010 | Vaidyanathan et al. | |
| 7,874,520 B2 | 1/2011 | McKinnon et al. | |
| 8,240,360 B2 * | 8/2012 | Bang | H01L 23/367 |
| | | | 165/80.3 |
| 8,908,253 B2 | 12/2014 | Hendaoui | |
| 8,960,608 B2 | 2/2015 | Goodzeit et al. | |
| 2014/0151485 A1 | 6/2014 | Baudasse et al. | |

* cited by examiner

VARIABLE HEAT REJECTION DEVICE

STATEMENT REGARDING FEDERALLY SPONSORED RESEARCH OR DEVELOPMENT

Some embodiments of this invention were developed with United States Government support under the National Aeronautics and Space Administration (NASA) announcement NNL12A3001N through award 12-12GCTC-0013. The Government may have certain rights in the invention.

CROSS REFERENCE TO RELATED APPLICATION

The present application is related to and claims priority from prior provisional application Ser. No. 62/123,999, filed Dec. 4, 2014, entitled "A device for variable heat rejection through passive shape change in response to temperature", the contents of which are incorporated herein by this reference and are not admitted to be prior art with respect to the present invention by the mention in the cross-reference section.

BACKGROUND

This invention relates to providing a system for improved heat rejection. More particularly, this invention relates to providing a system for variable heat rejection in vehicles that experience highly varying thermal environments, highly varying heat loads, or both. Missions or vehicles that experience such variability in thermal conditions are common in space exploration and this variability causes a difficult thermal control challenge Maintaining thermal control is critical for the function of vehicle electronics as well as life-support systems for crewed vehicles. The thermal control system must maintain a relatively constant internal environment temperature, especially in the case of crewed vehicles, despite the vastly varying thermal conditions. However, radiator systems used for this thermal control are limited in their turn-down, or range of heat rejection capacity. This limitation, a function of the basic design limitations of the current state-of-the art, having a constant area, view factor, and emissivity, drives thermal control system design toward choices such as toxic fluids with low freezing points, complex controls, limited missions, and multi-loop systems which increase cost, complexity and mass.

High turn-down is of particular interest for deep space exploration, such as for travel to and exploration of other planets, where an exploration vehicle spends large periods of time in extreme cold when in transit, but operates in a hot or variable environment when orbiting or exploring such bodies. A variable heat rejection system with high turn-down can enable single-loop thermal control systems throughout such a mission, thereby significantly reducing complexity and mass of an exploration vehicle. High turn-down variable heat rejection also enables unique spacecraft power plants needed for that may not be in use continuously, and expands the potential range of modern space travel.

For the reasons above, The need for improved variable heat rejection in space exploration has informed the development of related variable heat rejection devices, including stagnating radiators (U.S. Pat. No. 9,109,843), mechanically louvered (U.S. Pat. No. 3,872,911) and MEMS louvred radiators (U.S. Pat. No. 6,538,796), electrostatically augmented radiative surfaces (U.S. Pat. No. 6,899,170), electrochromic radiators (U.S. Pat. No. 8,679,582), and pressure driven expandable radiators (U.S. Pat. No. 4,813,476). A higher turn-down than has been thus far achieved is needed though for deep space exploration, with projections that better than 12:1 turn-down is required for a Martian mission. Some projections suggest a turn-down of 100:1 may be needed for other deep space missions of the future.

OBJECTS AND FEATURES OF THE INVENTION

A primary object and feature of the present invention is to provide a heat rejection system that varies the heat rejection capacity from a vehicle and has a high turn-down to overcome the above mentioned problem.

It is a further object and feature of the present invention to provide a thermal energy radiator that controls heat rejection capacity by way of a temperature sensitive shape memory material.

A further object and feature of the present invention is to provide a thermal energy radiator that can control heat rejection passively, without active control or instrumentation, by virtue of the temperature sensitive behavior of a shape memory material.

A further object and feature of the present invention is to provide a thermal energy radiator that actuates or changes shape of the radiator, by way of a shape memory material, which when above a transition temperature of said material increases heat rejected, and which when below a transition temperature of said material decreases heat rejected.

A further object and feature of the present invention is to provide a thermal energy radiator that when actuated or when shape changes it obscures or exposes active surfaces of heat rejection such that the effective view factor or area increases above a transition temperature and decreases below a transition temperature.

A further object and feature of the present invention is to provide a thermal energy radiator that when actuated or when shape changes it obscures or exposes surfaces of high and low emissivity such that the effective emissivity increases above a transition temperature and decreases below a transition temperature.

Yet another object and feature of the present invention is to provide a heat rejection system where an array of actuating or shape changing radiators may be arranged such that the heat rejection from the system varies in a relatively smooth manner and such that the temperature returning to the vehicle tends to approach a transition temperature of the shape memory material elements of the system.

A further object and feature of the present invention is to provide such a system that has low complexity, is efficient, lightweight, and useful. Other objects and features of this invention will become apparent with reference to the following descriptions.

SUMMARY OF THE INVENTION

In accordance with a preferred embodiment hereof, this invention provides a heat rejection system, related to variable heat emissions for the thermal control of extraterrestrial vehicles, that employs temperature sensitive shape memory materials to modify the shape of a thermal energy radiator such that effective thermal energy emissions are increased above a transition temperature and decreased below a transition temperature, where said transition temperatures may not be identical. Said heat rejection system comprises: at least one thermal energy radiator structured and arranged to reject heat from at least one heat source; at least one thermal transport system consisting of at least one thermal loop which transfers heat from said heat source to said thermal energy radiator; and at least one thermal connector structured and arranged to thermally connect such at least one thermal loop to said at least one thermal energy radiator; wherein said thermal loop comprises at least one thermal transport fluid structured and arranged to transport such collected heat; wherein such at least one thermal energy radiator contains at least one temperature sensitive shape memory material integral to the structure of said thermal energy radiator; wherein such thermal energy radiator contains at least one bias loading structure integral to the structure of said thermal energy radiator; wherein such thermal energy radiator system is structured and arranged to change the shape of such thermal energy radiator.

Moreover, it provides such a heat rejection system wherein such at least one thermal energy radiator contains at least one temperature sensitive shape memory structure containing a shape memory material with properties that comprise: a condition capable of producing large deformation or strain when stressed or loaded at a temperature below at least one transition temperature of said material; a remembered or trained condition at a temperature above at least one transition temperature of said material wherein a trained shape, or shape memory, is recovered; wherein such recovery returns said material to its undeformed shape by means of force as is consistent with established one-way behavior of shape memory materials. Additionally, it provides such a thermal energy radiator further comprising a bias loading structure consisting of: a structure having an initial configuration and arrangement consistent with at least one cold shape of said thermal energy radiator; said structure having the flexibility to bend or flex from said at least one cold shape to at least one warm shape without material failure; wherein said structure generates a forcing load that resists said deformation consistent with the established behavior of springs. Additionally, it provides such a thermal energy radiator further comprising a thermally conductive structure consisting of: a thermally conductive structure structured or arranged to transport heat from above described thermal connector to the active heat rejection surface of the thermal energy radiator; a thermally conductive structure further structured and arranged to communicate thermal energy radiator temperature to or near the above described shape memory structure; wherein the above described bias structure may be inclusive of said thermally conductive structure or said thermally conductive structure may be in addition to said bias structure and shape memory structure. Also, it provides such a thermal energy radiator such that said bias loading structure and said temperature sensitive shape memory material are structured and arranged to produce a temperature dependent shape change of at least one thermal energy radiator consisting of: at a temperature above at least one transition temperature of said at least one thermal energy radiator the shape memory material, in above described condition wherein it recovers an undeformed shape, applies a forcing load upon the bias structure causing said structure to bend or flex and said radiator to take at least one shape having a high heat rejection capacity; at said high temperature said bias structure is deformed until the resisting load of said structure matches that of said shape memory structure or until said shape memory structure has recovered fully its undeformed shape; at a temperature below at least one transition temperature of at least one thermal energy radiator the bias structure of said radiator the shape memory structure, in above described deformable condition, deforms under the load of the bias structure such that the bias structure returns said radiator to take at least one shape having a low heat rejection capacity.

In addition, it provides such a heat rejection system wherein such at least one thermal energy radiator takes at least two shapes comprising: at least one shape which results in a low heat rejection capacity through the obscuring and exposing of surfaces to reduce effective view factor, effective area, and effective emissivity, or any combination of these parameters of heat rejection; at least one shape which results in a high heat rejection capacity through the obscuring and exposing of surfaces to increase effective view factor, effective area, and effective emissivity, or any combination of these parameters of heat rejection; wherein said high heat rejection shape exposes a high emissivity active heat rejection surface, increasing the view factor of said surface to space, via the shape memory-bias behavior above described; wherein said low heat rejection shape obscures said high emissivity active heat rejection surface by causing it to view itself and exposing instead the opposite surface of the thermal energy radiator having very low emissivity to space, decreasing the view factor of the active surface. In addition, it provides such a heat rejection system wherein such at least one thermal energy radiator may have thermal energy radiation shields or covers placed over gaps or open ends of the low heat rejection shape such that heat rejection through said open ends is minimized; said shields may be permanent or deployable by any means.

In addition, it provides such a heat rejection system wherein at least one such thermal energy radiator may be structured and arranged in an array such that the heat rejection capacity varies in a smooth manner comprising: an array of said thermal energy radiator systems arranged in parallel, series, or both; an array thermal transport system as otherwise described above by the thermal transport system which is structured and arranged to transport heat within said array to each such thermal energy radiator in the order with which said array is arranged; wherein said array thermal transport system comprises at least one thermal transport fluid as otherwise described above; wherein thermal energy emission from a given thermal energy radiator in said array changes the thermal transport fluid temperature passing the position of said thermal energy radiator creating a temperature gradient in the array thermal transport system; wherein each thermal energy radiator system responds to temperature local to its position on the array heat transport system which causes thermal energy radiators at positions in the array thermal transport system with a temperature above at least one transition temperature of the thermal energy radiator to take a high heat rejection shape, and causes thermal energy radiators at positions in the array thermal transport system with a temperature below at least one transition temperature of the thermal energy radiator to take a low heat rejection shape and thus limit heat rejection and also; wherein such point where a transition occurs in the array thermal transport system moves upstream or downstream as vehicle heat load or thermal environment varies so that the number of thermal energy radiators in a given heat rejection state also varies with said stimuli; wherein the quantity and width of such thermal energy radiators in said array determines the smoothness of variation in heat rejection capacity of the heat rejection system.

Moreover, it provides such a radiator system wherein such temperature sensitive behavior of the above described bias and shape memory structures in response to thermal conditions is passive in nature requiring no instrumentation, requiring no active control, and requiring no addition of power other than that contained by the thermal energy being rejected. Further, said heat rejection system behaves as described continuously in response to thermal conditions over the operating life of said heat rejection system once initiated into service unless and until an external means restrains its function.

DETAILED DESCRIPTION OF THE BEST MODES AND PREFERRED EMBODIMENTS OF THE INVENTION

Figure 1:
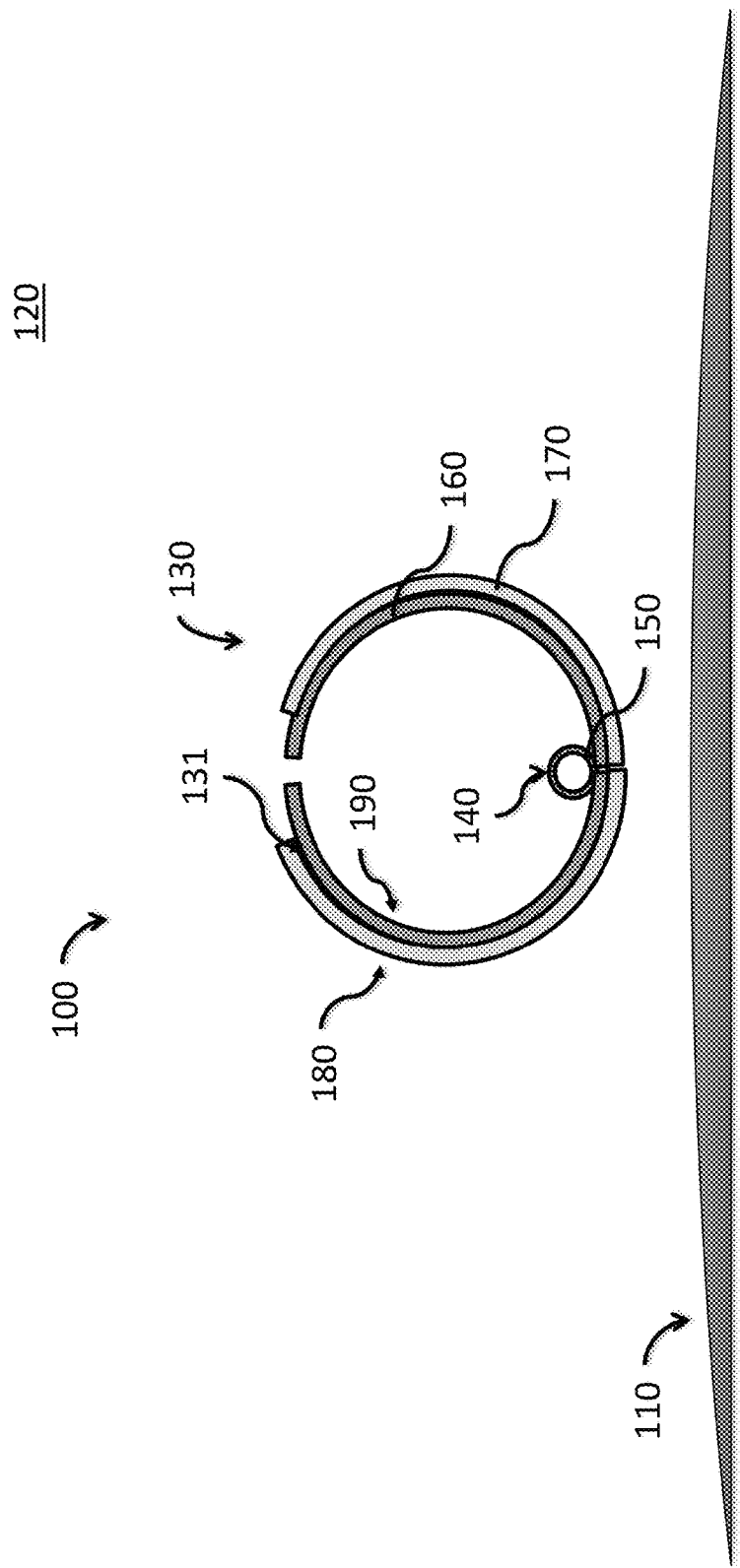
FIG. 1 and FIG. 2 shows a diagrammatic cross sectional view illustrating a cold or low heat rejection state (FIG. 1) and a warm or high heat rejection state (FIG. 2) of a thermal energy radiator according to a preferred embodiment of the present invention.
Figure 2:
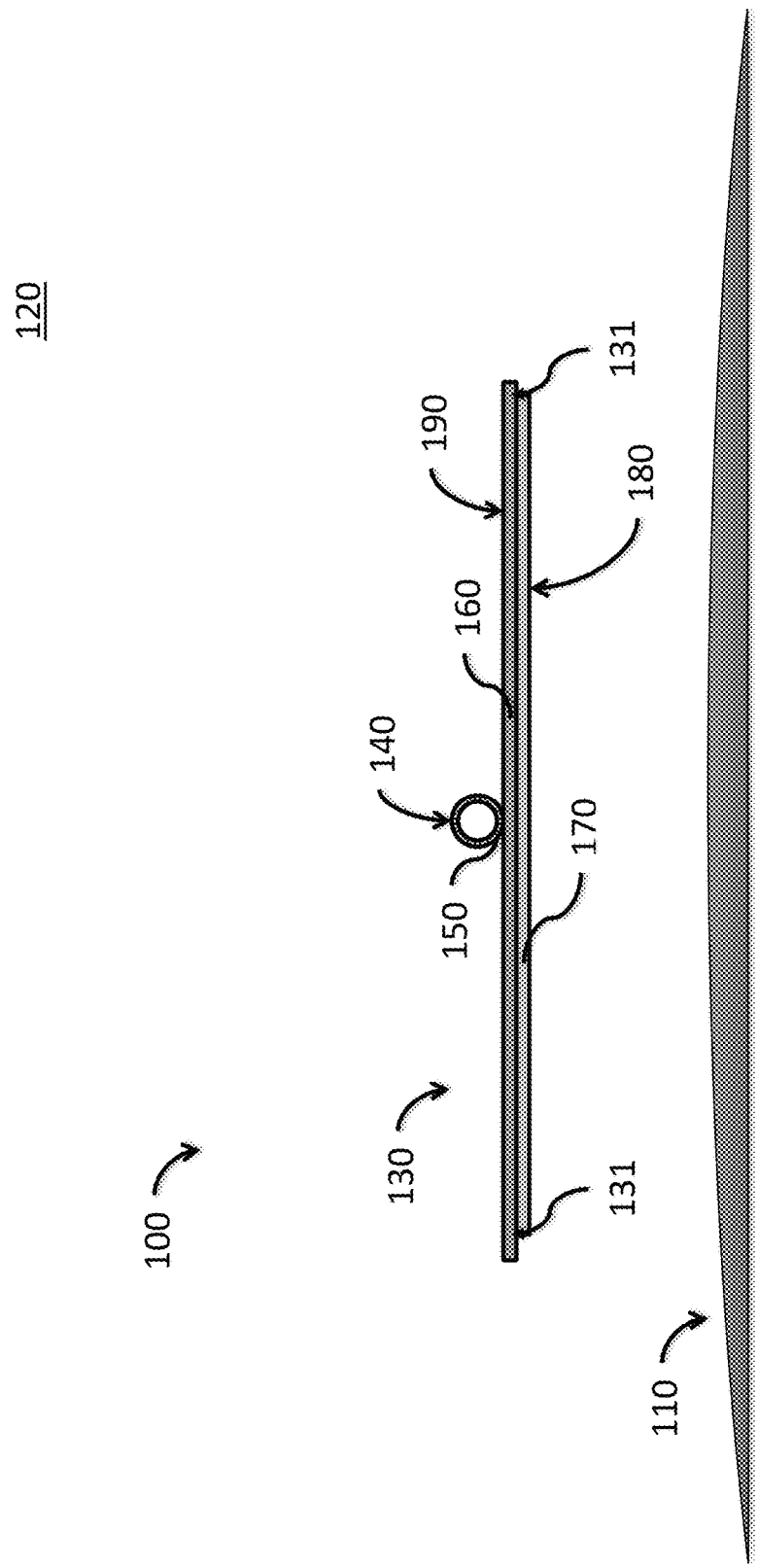

FIG. 1 and FIG. 2 show a diagrammatic cross sectional view illustrating a cold or low heat rejection state and a warm or high heat rejection state, respectively, of thermal energy radiator system 100 at least one of which comprises a key and enabling element of a heat rejection system 300 (see FIG. 3) according to a preferred embodiment of the present invention. A spacecraft, satellite or other extraterrestrial vehicle 110 (shown in part only and to rough scale) preferably includes an environment 311 for crew 320, heat generating hardware and systems 330, or both, and at least one thermal energy radiator system 100. Heat is preferably collected from heat sources within the vehicle 110 and transported to a heat rejection system 300 by means of a thermal control system 310.

Extraterrestrial environment 120 comprises a range of temperatures and other conditions that are uninhabitable by humans and inhospitable to electronics, avionics and hardware, and thus requires the use of a thermal control system 310 to maintain a vehicle environment 310 hospitable to the intended mission and function of the vehicle 110. In the case of a crewed vehicle 110 the vehicle environment 311 must be human-life supporting, and preferably comprises an enclosed space with artificially-controlled atmospheric conditions hospitable to human life. Any exchange between vehicle environment 311 and the external environment 120 is preferably controlled to maintain these conditions.

Figure 3:
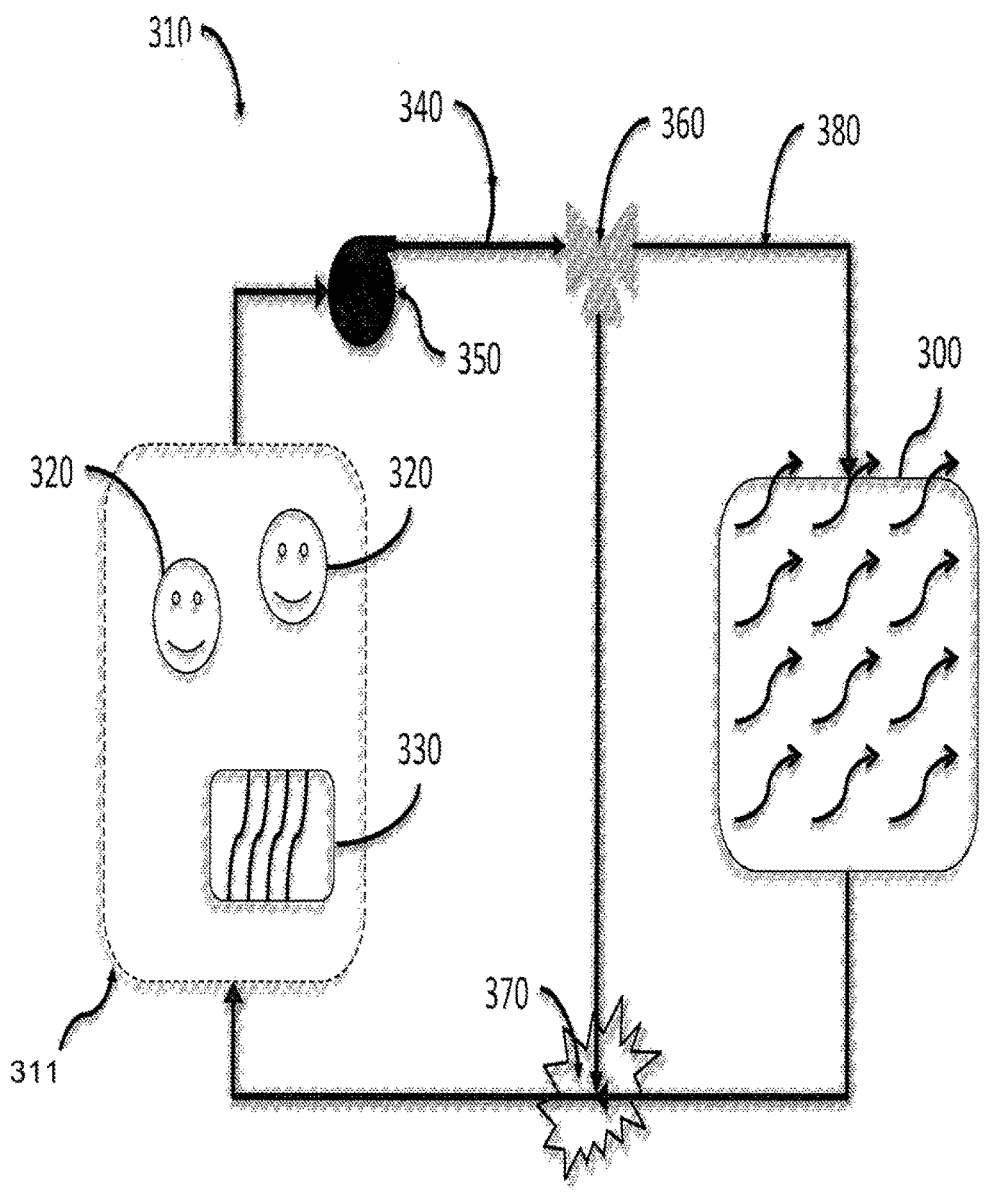
FIG. 3. shows a diagrammatic view illustrating a thermal fluid heat transport system having at least one heat rejection system according to the preferred embodiment of FIG. 1 and FIG. 2.

Heat rejection system 300 preferably functions to regulate the temperatures of maimed spacecraft 110, by transporting heat to at least one thermal energy radiator 100 which preferably emits heat into the external environment 120. Manned spacecraft 110 preferably comprises multiple subsystems each of which are heat sources and are temperature sensitive. Heat must be transported away from such subsystems to maintain temperatures within operating ranges. Likewise, human-life supporting environment 311 preferably utilizes temperature regulation to maintain a comfortable environment. Primarily, heat rejection system 300 preferably transports heat away from at least one heat source as shown in FIG. 3, to at least one thermal energy radiator 100 to be radiated into external environment 120.

When manned spacecraft 110 operates with all subsystems running at full capacity, the heat load rejected preferably is at maximum capacity of the heat rejection system 300. Should a spacecraft continuously need to operate only at or near this maximum heat load, a heat rejection system 300 for the spacecraft only need be designed to transport a narrow range of heat and operate continuously at that level of heat transportation. However, when a spacecraft operates in multiple configurations, having differing subsystems operating simultaneously, the heat load may be anywhere from maximum (all subsystems running) to a minimum (all or nearly all subsystems in standby generating nearly no heat). Manned spacecraft 110 is preferably utilized with such a widely varying heat load, preferably over the course of an operational run, alternately preferable over the course of multiple operational runs.

Further, the thermal environment 120 to which the thermal energy radiator emits heat varies. When vehicle 110 orbits a planet the thermal environment 120 cycles as a function of orbital period where periods of warm temperature occur in view of the sun and periods of cold temperature occur in the shadow of the planet. Vehicle 110 in transit to a distant planet, satellite, or other celestial body experiences long periods of extreme cold preceded and followed by a much warmer cyclic orbital thermal environment 120. Vehicle 110 which further explores other celestial bodies can experience a wide range of thermal environment 120 depending on the size of the body, the presence of atmosphere, and relative orientation on the body with respect to the sun, and the rotating period of the body. When a thermal energy radiator 100 emits heat to a warm thermal environment 120 its capacity to emit heat is less than when the same radiator emits heat to a cold thermal environment 120. As with heat load, should a spacecraft 110 operate in a constant thermal environment 120 a heat rejection system 300 need be designed only to reject a narrow range of heat. Where spacecraft 110 rejects heat to a varying thermal environment 120 it must be designed to reject the maximum heat load at the warmest environment temperature (the hot condition), and to reject the minimum heat load at the coldest environment temperature, (the cold condition). Manned spacecraft 110 is preferably utilized with such a widely varying thermal environment, preferably over the course of an operational run, alternately preferable over the course of multiple operational runs.

Upon reading the teachings of this specification, those skilled in the art will now appreciate that, under appropriate circumstances, considering such issues as cost, future technologies, etc., other applications of heat rejection systems, such as, for example, lunar-type bases, non-terrestrial planetary colonies, etc., may suffice.

The dangers in operating a radiator system at widely varying heat loads and thermal environments, without a variable heat load capacity, present themselves in the two extremes of operation. If a radiator system is designed for high heat loads in the warmest environment, when it then operates at low heat loads and cold environments, it transports too much heat and the subsystems of the spacecraft become too cold resulting in condensation or extreme thermal contraction and subsystem failures. Further, if this high heat load radiator system operates at too low of a temperature the thermal fluid within the radiator may freeze causing radiator failure and heat transport problems which compound when the heat load rises again.

If a radiator system is designed for lower heat loads in the coldest environment, when it operates at high heat loads, it is not capable of transporting enough heat and the subsystems of the spacecraft become overheated and fail. Likewise, personnel in either extreme condition of operation will experience life-threatening, mental, and other problems.

A radiator system is typically static in form, which is to say that once placed into service, or deployed, the radiator system is a rigid structure having a set area, a set view factor, and a set surface emissivity. These properties describe the heat rejection capacity of a thermal energy radiator system as defined by the Stefan-Boltzmann relationship which is known as $Q=\varepsilon\sigma FA(T4-T_{ENV}4)$ where Q is the heat rejection, $\varepsilon$ is the emissivity of a surface, F is the view factor between objects, A is the area of the emitting surface, T is the temperature of that surface, $T_{env}$, is the temperature of the environment, and $\sigma$ is a constant. The static nature of the radiator system has generally led toapproaches to the problem of variable heat load and variable environment which vary the temperature or emissivity of the surface. Examples of temperature approaches include fluid choice, where a working fluid having a very low pour point and wide operating range is used, regenerative heat exchangers, which cool the fluid entering the radiator using fluid exiting the radiator, and a stagnating fluid, where the thermal working fluid is made to stall in portions of the radiator system reducing the heat transported to those portions of the radiator. Examples of emissivity approaches include electrochromic materials, which change emissivity upon the application of a voltage. Other approaches have added hardware to the radiator which obscure the surface thus changing view factor which include louvers and micro louvers.

The cold and hot shapes described in FIG. 1 and FIG. 2, respectively, of the thermal energy radiator 100 correspond in heat rejection function to the extreme cases described above, which serves to demonstrate the variable heat rejection capability of the preferred embodiment of the present invention. The thermal energy radiator 100 comprises at least one facesheet 130, at least one heat transport loop 140, and a thermal connection between these elements 150. The facesheet further comprises a coupled bias structure 160 and a shape memory structure 170. The shape memory structure 170 contains a material which exhibits the behavior of shape memory.

Shape memory is a behavior of certain metal alloys, polymers, and other classes of materials whereby after large plastic deformation the material is able to recover its original shape in the presence of stimulus. The prefered stimulus is temperature such that large deformation may occur below at least one transition temperature of the shape memory material and the original shape of the material is recovered when its temperature rises above at least one transition temperature. This particular behavior is referred to as one-way shape memory and is the prefered behavior of the shape memory structure 170. Other shape memory behaviors are also possible, including a behavior referred to as two-way shape memory where the material is trained to recover two shapes, one above at least one transition temperature, and one below at least on transition temperature. Upon reading the teachings of this specification, those skilled in the art will now appreciate that, under appropriate circumstances, considering such issues as cost, future applications, application parameters, etc., other shape memory behaviors, such as, for example, two-way shape memory or triple-shape memory, may suffice.

Several shape memory alloys exhibit behavior according to the prefered stimulus. The temperature at which these shape memory alloys transition is in part a function of the alloying composition so that a shape memory structure composed of such an alloy may be tailored to the operating constraints of the spacecraft 110. The preferred shape memory material is a Nickel-Titanium based metal alloy with transition temperatures in the vicinity of 0 C. Upon reading the teachings of this specification, those skilled in the art will now appreciate that, under appropriate circumstances, considering such issues as thermal working fluid, operating temperature, future applications, application parameters, etc., other shape memory materials, such as, for example Copper and ferrous based shape memory materials or shape memory polymers, etc., and other transition temperature ranges, may suffice.

Bias structure 160 preferably is multi-functional sheet having a spring-like flexible and thermally conductive behavior. The bias structure 160 has an unloaded, unstressed shape that corresponds generally with the cold shape of the thermal energy radiator 100 shown in FIG. 1. The bias structure 160 behaves as a spring such that a force must be applied to bend the structure from its unloaded shape, and that this force increases according to a function of the magnitude of that bending deflection. The bias structure 160 transports heat conductively from the heat transport loop 140 to the active surface 190 of the thermal energy radiator facesheet 130. It also serves thus to communicate local temperature of the thermal energy radiator facesheet 130 to the shape memory structure 170. The bias structure 160 preferably comprises a high conductivity carbon fiber composite material for the combined high spring stiffness, high thermal conductivity, and weight efficiency. Upon reading the teachings of this specification, those skilled in the art will now appreciate that, under appropriate circumstances, considering such issues as cost, future applications, available materials, etc., other materials, for example glass fiber composites, or spring steels laminated with graphite, etc., may suffice.

Shape memory structure 170 has an undeformed, or memory of the shape that corresponds generally with the hot shape of the thermal energy radiator 100 shown in FIG. 2. Shape memory structure 170 preferably comprises a wire coupled to the bias structure 160 at least at each end 131 of the facesheet 130. Upon reading the teachings of the specifications, those skilled in the art will now appreciate that, under appropriate circumstances, considering such issues as cost, future applications, available materials, etc., other structural forms of the shape memory structure, for example sheet, tube, strip, etc., may suffice.

This coupling preferably comprises shape memory structure 170 coupled to bias structure 160 such that force is transferred between the structures. When the temperature of the facesheet 130 is below at least one transition temperature of the shape memory structure 170, the shape memory structure 170 deforms under the spring loading force of the bias structure 160 until the bias structure recovers its undeformed shape or until the spring force of the bias structure matches the resisting load of the deforming shape memory structure 170, resulting in the cold shape of the thermal energy radiator 100 shown in FIG. 1. When the temperature of the facesheet 130 rises above at least one transition temperature of the shape memory structure 170, the shape memory structure 170 forcibly recovers to its original shape, deforming and loading the bias structure 160 until the shape memory structure 170 returns to its original shape or until the spring force of the deformed bias structure 160 matches the recovery loading of the shape memory structure 170, resulting in the hot shape of the thermal energy radiator 100 shown in FIG. 2. Upon reading the teachings of this specification, those skilled in the art will now appreciate that, under appropriate circumstances, considering such issues as cost, future applications, available materials, etc., shapes other than illustrated may be employed to the same or greater effect, such as, for example, a teardrop cross section, an ellipse cross section, a curvilinear triangle cross section, etc., may suffice.

The thermal energy radiator 100 further presents surfaces of differing thermal emissivity. The active surface 190 of the thermal energy radiator facesheet 130 is preferably coated or treated for a high emissivity. The active surface 190 treatment preferably comprises a silver-Teflon material, AZ93 white paint, or a treatment having significantly similar high emissivity and low solar absorptivity properties. The inactive surface 180 is preferably coated or treated for a low emissivity. The inactive surface 180 treatment preferably comprises at least one layer of aluminized mylar, where multiple layers are separated by a small gap to minimize heat transport through this side. Upon reading the teaching of this specification, those skilled in the art will now appreciate that, under appropriate circumstances, considering such issues as cost, future applications, available materials, etc., other treatments may be applied for similar effect, such as, for example, various colors of space rated paint, silvered film, multi-layer insulation, etc., may suffice.

The combination of temperature sensitive shape change and the obscuring and exposing of active 190 and inactive 180 surfaces affords a large change in effective emissivity and a change in effective view factor from the cold shape of thermal energy radiator 100 of FIG. 1 to the hot shape of the thermal energy radiator 100 of FIG. 2. This behavior results in a very low heat rejection capacity for the cold shape appropriate for low heat loads in extreme cold environments 150, and a very high heat rejection capacity for the hot shape appropriate for high heat loads in warm thermal environments 150.

FIG. 3 shows a diagrammatic view illustrating thermal control system 310 according to a preferred embodiment of the present invention which consists of a heat rejection system 300, a previously described thermally controlled environment 311 having heat sources, and a heat transport system 340 which transports heat from vehicle heat sources 320 and 330 to the heat rejection system 300. The heat transport system 310 preferably consists of at least one single-loop thermal fluid loop 380 consisting of a thermal fluid capable of transporting heat, preferably a non-toxic fluid such as propylene glycol, and may include a pump 350 and a bypass mixing valve 360 which controls flow to maintain a setpoint temperature at 370. Upon reading the teaching of this specification, however, those skilled in the art will now appreciate that the variable shape behavior of the thermal energy radiator facesheet 130 does not require a fluid loop 340 to achieve the described behavior; other thermal transport systems may be employed, such as conductive heat transport coupled directly to a heat source, thermoelectric heat transport, etc., may suffice.

Figure 4:
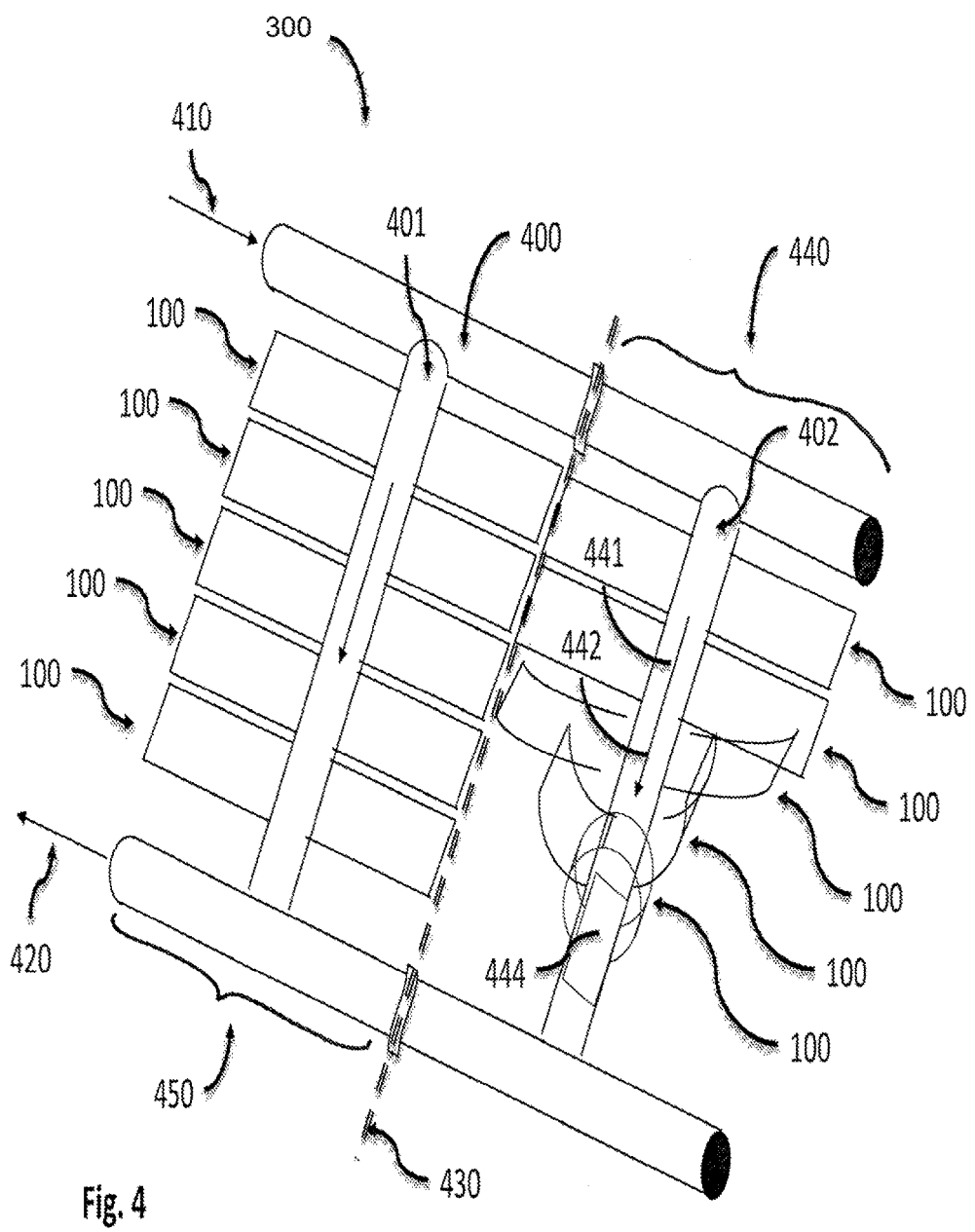
FIG. 4. shows a diagrammatic view illustrating behavior of a heat rejection system containing an array of the thermal energy radiators according to the preferred embodiment of FIG. 3.

FIG. 4 shows the heat rejection system 300 as comprised of at least one thermal energy radiator 100 arranged as an array in both series and parallel, where any arrangement in series, parallel, or both is preferred, and an array heat transport system 400 which transports heat from the heat transport system 340 to each thermal energy radiator 100 in the array according to the arrangement of the array. The array heat transport system 400 receives thermal fluid from the heat transport system 310 fluid loop 380 at an inlet to the array 410. Thermal fluid then travels from the inlet to the array 410 through the array heat transport system 400 transferring heat from the thermal fluid to at least one thermal energy radiator 100, passing in the process through fluid passages 401 and 402 according the the arrangement of thermal energy radiators 100 in the flow path, and exits the array heat transport system 400 to the vehicle heat transport system 380 by way of the array heat transport system outlet 420. Each thermal energy radiator 100 in the heat rejection system 300 responds to temperature local to its position on the array heat transport system 400. As the fluid moves along fluid passage 401 and 402, heat is transported to each thermal energy radiator 100 which rejects that heat to the thermal environment 120, thereby reducing the temperature of the fluid before it moves to the next radiator. This behavior creates a temperature gradient along fluid passages 401 and 402. This gradient, and the quantity of thermal energy radiators in the fluid path, allows for smooth variation of heat rejection system 300 heat rejection capacity.

For illustration of this smoothing behavior, FIG. 4 is separated into two independent heat load cases, high heat load case 450 to the left of imaginary line 430 and low heat load case 440 to the right of imaginary line 430. In the high heat load case 450 the inlet fluid 410 temperature is high. This high temperature fluid is distributed through fluid passages 401 where the high temperature causes all thermal energy radiators to take the high heat rejection shape. As the high temperature fluid travels along fluid passage 401 and the temperature of the fluid declines as heat is removed from it, it nevertheless does not decline to a temperature below the transition temperature of any of the thermal energy radiators 100 in fluid path 401. In the low heat load case 440 the inlet fluid temperature is lower, but still high enough that all thermal energy radiators 100 in fluid passage 402 at and upstream of 441. At position 442 the local temperature has dropped sufficiently that a portion of the thermal energy radiator 100 at that position has fallen below the transition for that component. This process continues until at position 444 the low fluid temperature has caused the thermal energy radiator 100 to take a low heat rejection shape and thus limit heat rejection.

This smoothing behavior has the further effect of limiting the lowest fluid temperature returning to the thermal control system 310 at array heat transport system outlet 420 to a value in the vicinity of the lowest common transition temperature of the heat rejection system 300.

Turn-down of heat rejection system 300 may be increased significantly by placement of radiative shields or covers, whether permanently or temporarily, at each end of the series arrangement of thermal energy radiators 100 as illustrated on flow passages 401 and 402. Such a shield, to be effective, would have a low emissivity and would preferably be composed of a multilayer insulation, and would cover all gaps in the cold shape thus blocking a view of the active surface 190 of the thermal energy radiator 100 to the thermal environment 120.

Further note of the behavior is that it is continuous and passive. The taking of a hot and cold shape by the thermal energy radiator 100 occurs continuously once put into service and until arrested by an external restraint, without external action, as temperature of the radiator varies, as vehicle heat load varies, and as thermal environment 120 varies.

Although applicant has described applicant's preferred embodiments of this invention, it will be understood that the broadest scope of the invention includes modifications such as diverse shapes, sizes, arrangements, shape memory behaviors, etc. Such scope is limited only by the below claims as read in connection with the above specification. Further, many other advantages of applicant's invention will be apparent to those skilled in the art from the above descriptions and the below claims.

What is claimed is:

1. A thermal energy radiator system, relating to a variable heat rejection, that controls the heat rejection capacity at least in part through articulation or shape change of at least one thermal energy radiator, the thermal energy radiator system comprising:
 a) at least one thermal energy radiator structured and arranged to radiate thermal energy generated by at least one thermal energy source of at least one spacecraft into an external environment;
 b) at least one thermal energy transport system structured and arranged to collect heat from said at least one thermal energy source and transport said collected heat to said at least one thermal energy radiator;
 c) wherein said at least one thermal energy transport system transports heat through any typical means of heat transport including, but not limited to, thermal fluid flow and thermal conduction;
 d) wherein said at least one thermal energy radiator contains a facesheet structure which articulates or changes shape in response to a temperature of said at least one thermal energy radiator, said at least one thermal energy transport system, or thermal environment, said facesheet structure articulating or changing between at least one first shape and at least one second shape, said at least one first shape having a higher heat rejection capacity than said at least one second shape, the articulating or changing between said at least one first shape and said at least one second shape selectively obscuring and exposing, in whole or part, thermal energy radiator surfaces of said at least one thermal energy radiator to affect an effective view factor and selectively obscuring and exposing, in whole or part, of emissivity surfaces so as to affect an effective emissivity.

2. The thermal energy radiator system according to claim 1, said at least one thermal energy radiator comprising a material having a temperature-sensitive shape memory inherent to said material such that articulation or shape change of said thermal energy radiator can occur without active control or the addition of any power other than thermal power provided by said at least one energy transport system or a thermal environment.

3. The thermal energy radiator system according to claim 1 wherein:
 a) said thermal energy radiator surfaces of said at least one thermal energy radiator are selectively obscured when said facesheet structure is in said second shape;
 b) said thermal energy radiator surfaces of said at least one thermal energy radiator are selectively exposed when said facesheet structure is in said first shape;
 c) wherein said thermal energy radiator surfaces of said at least one thermal energy radiator may be obscured or exposed in whole or in part; and
 d) wherein an effective view factor or an area of thermal energy heat rejection to a sink temperature is lower when said facesheet structure is in said second shape than when said facesheet structure is in said first shape.

4. The thermal energy radiator system according to claim 1, said emissivity surfaces comprising at least a first emissivity surface and a second emissivity surface, said first emissivity surface having a greater emissivity value than said second emissivity surface wherein:
 a) the first emissivity surfaces of said thermal energy radiator surfaces of said at least one thermal energy radiator are obscured and said second emissivity surfaces are exposed when said facesheet is in said second shape;
 b) the first emissivity surfaces of said thermal energy radiator surfaces of said at least one thermal energy radiator are exposed and said second emissivity surfaces are obscured when said facesheet is in said first shape;
 c) wherein said first and second emissivity surfaces may be coated, covered, or otherwise treated to achieve a desired emissivity;
 d) wherein said first and second emissivity surfaces may be obscured or exposed in whole or in part;
 e) wherein said effective emissivity of thermal energy heat rejection to a sink temperature is lower when said facesheet is in said second shape; and
 f) wherein said effective emissivity of thermal energy heat rejection to the sink temperature is higher when said facesheet is in said first shape.

5. The thermal energy radiator system according to claim 1, wherein said at least one thermal energy radiator comprises:
 a) at least one bias structure which in an unloaded state has a shape roughly approximating said second shape of the facesheet of said at least one thermal energy radiator; and
 b) at least one shape memory structure which in an undeformed or remembered shape roughly approximates said first shape of the facesheet of said at least one thermal energy radiator.

6. The thermal energy radiator system according to claim 1, wherein said at least one thermal energy radiator is movable between a flat sheet shape and a closed or partially closed rounded shape.

7. The thermal energy radiator system according to claim 2, wherein said at least one thermal energy radiator is actively controlled by heating a shape memory material component of said at least one thermal energy radiator.

8. The thermal energy radiator system of claim 1, said at least one thermal energy radiator comprising an array of thermal energy radiators arranged in one of a series arrangement, a parallel arrangement, and combinations thereof in said at least one thermal energy transport system, wherein each thermal energy radiator of said array of thermal energy radiators responds to a respective temperature local to a respective place in the array of thermal energy radiators.

9. The heat rejection system according to claim 8, wherein a fluid loop consisting of at least one thermal fluid which is capable of transporting heat transports heat from at least one source to each of said thermal energy radiators of said array of said thermal energy radiator according to the respective place in said array of thermal energy radiators of the respective thermal energy radiator.

10. The heat rejection system according to claim 8, wherein a thermal radiation shield is provided to cover gaps at each end of a series arrangement of at least one thermal energy radiator.

* * * * *